(12) United States Patent
Tseng et al.

(10) Patent No.: US 11,886,032 B2
(45) Date of Patent: Jan. 30, 2024

(54) CAMERA DRIVING MODULE AND ELECTRONIC DEVICE

(71) Applicant: LARGAN DIGITAL CO., LTD., Taichung (TW)

(72) Inventors: Te-Sheng Tseng, Taichung (TW); Ming-Ta Chou, Taichung (TW); Wen-Hung Hsu, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 17/874,112

(22) Filed: Jul. 26, 2022

(65) Prior Publication Data

US 2022/0357545 A1 Nov. 10, 2022

Related U.S. Application Data

(63) Continuation of application No. 16/687,430, filed on Nov. 18, 2019, now Pat. No. 11,435,546.

(30) Foreign Application Priority Data

Apr. 24, 2019 (TW) .................................. 108114321

(51) Int. Cl.
*G02B 7/02* (2021.01)
*G02B 7/09* (2021.01)
*G03B 13/36* (2021.01)

(52) U.S. Cl.
CPC .................. *G02B 7/02* (2013.01); *G02B 7/09* (2013.01); *G03B 13/36* (2013.01)

(58) Field of Classification Search
CPC .... G03B 13/36; G03B 13/002; G03B 13/004; G03B 13/06; G03B 13/16; G03B 17/02;
(Continued)

(56) References Cited

U.S. PATENT DOCUMENTS

| 7,589,920 | B2 | 9/2009 | Shin |
| 8,810,714 | B2 | 8/2014 | Seol |

(Continued)

FOREIGN PATENT DOCUMENTS

| CN | 103369223 | 10/2013 |
| CN | 103728709 | 4/2014 |

(Continued)

OTHER PUBLICATIONS

Indian Office Action issued in corresponding application No. 202034003615, dated Feb. 23, 2021.

(Continued)

*Primary Examiner* — Stephone B Allen
*Assistant Examiner* — Tamara Y. Washington
(74) *Attorney, Agent, or Firm* — Maschoff Brennan

(57) ABSTRACT

A camera driving module includes: a base including a central opening; a casing disposed on the base and including an opening hole corresponding to the central opening; a lens unit movably disposed on the casing; and a focus driving part. The focus driving part includes a carrier, an AF coil element, at least two permanent magnets and a Hall element. The carrier is disposed on the lens unit and movable in a direction parallel to an optical axis. The AF coil element is fixed to the base and faces toward the carrier. The permanent magnets are fixed on one side of the carrier facing toward the base and disposed opposite to each other about the optical axis. The Hall element faces toward a corresponding surface of one of the permanent magnets. The AF coil element and the corresponding surfaces are arranged in the direction parallel to the optical axis.

15 Claims, 14 Drawing Sheets

(58) Field of Classification Search
CPC .......... G03B 17/14; G03B 17/12; G02B 7/09; G02B 7/08; G02B 7/04; G02B 7/21; G02B 7/025; G02B 7/18; G02B 7/24; G02B 7/28; G02B 27/646
See application file for complete search history.

(56) References Cited

U.S. PATENT DOCUMENTS

| | | | |
|---|---|---|---|
| 9,046,737 B2 | 6/2015 | Seol |
| 9,578,242 B2 | 2/2017 | Kang |
| 9,618,770 B2 | 4/2017 | Park |
| 9,726,899 B2 | 8/2017 | Kim |
| 9,804,477 B2 | 10/2017 | Bang |
| 9,848,126 B2 | 12/2017 | Kang |
| 9,857,556 B1 | 1/2018 | Kim |
| 9,885,881 B2 | 2/2018 | Kim |
| 9,915,802 B2 | 3/2018 | Murakami |
| 9,955,077 B2 | 4/2018 | Lim |
| 9,995,902 B2 | 6/2018 | Baik |
| 9,995,904 B2 | 6/2018 | Lee |
| 10,809,489 B2 | 10/2020 | Sugawara |
| 2018/0335601 A1 | 11/2018 | Hu |
| 2018/0335602 A1 | 11/2018 | Hu |
| 2018/0335603 A1 | 11/2018 | Hu |
| 2018/0338069 A1 | 11/2018 | Hu |

FOREIGN PATENT DOCUMENTS

| | | |
|---|---|---|
| CN | 104136985 | 11/2014 |
| CN | 104583830 | 4/2015 |
| CN | 106291862 | 1/2017 |
| CN | 106687846 | 5/2017 |
| KR | 10-2019-0080760 A | 7/2019 |
| TW | 201102692 A | 1/2011 |
| TW | M485413 U | 9/2014 |

OTHER PUBLICATIONS

TW Office Action in Application No. 108114321 dated Jul. 13, 2020.

Chinese Office Action dated Jun. 22, 2022 as received in application No. 201910412590.1.

CAMERA DRIVING MODULE AND ELECTRONIC DEVICE

RELATED APPLICATIONS

This application is a continuation patent application of U.S. application Ser. No. 16/687,430, filed on Nov. 18, 2019, which claims priority to Taiwan Application 108114321, filed on Apr. 24, 2019, which is incorporated by reference herein in its entirety.

BACKGROUND

Technical Field

The present disclosure relates to a camera driving module and an electronic device, more particularly to a camera driving module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

A conventional lens assembly usually includes a lens barrel and a lens carrier assembled together by their thread structures. The lens assembly adjusts the position of the lens barrel with respect to the lens carrier by rotating the lens barrel so as to focus images onto the image surface of the image sensor. However, the design requirements of thread structures may inevitably increase the size of the lens assembly and the assembling complexity. Furthermore, many conventional lens assemblies on the market usually have a voice coil motor (VCM) as a camera driver module for auto focus, and this kind of camera driver module usually consists of several components. For the requirements of accuracy and smoothness of movement of the lens unit, multiple alignment and calibration steps are needed during the assembly process of the camera driver module and the lens unit itself in order to complete the assembly of those components accurately. As a result, the manufacturing efficiency and yield rate of the camera driver module are therefore influenced.

Accordingly, how to improve the camera driver module for achieving a compact lens assembly and simplifying the assembly process of the lens assembly so as to meet the requirement of high-end-specification electronic devices is an important topic in this field nowadays.

SUMMARY

According to one aspect of the present disclosure, a camera driving module includes a base, a casing, a lens unit and a focus driving part. The base includes a central opening. The casing is disposed on the base, and the casing includes an opening hole corresponding to the central opening of the base. The lens unit is movably disposed on the casing. The focus driving part is configured to drive the lens unit to move in a direction parallel to an optical axis, and the focus driving part includes a carrier, an AF coil element, at least two permanent magnets and a Hall element. The carrier is disposed on the lens unit, and the carrier is movable in the direction parallel to the optical axis. The AF coil element is fixed to the base, and the AF coil element faces toward the carrier. The permanent magnets are fixed on one side of the carrier facing toward the base, and the permanent magnets are disposed opposite to each other about the optical axis. Each of the permanent magnets includes a corresponding surface facing toward the AF coil element. The Hall element faces toward the corresponding surface of one of the permanent magnets. The Hall element detects a displacement of the lens unit in parallel with the optical axis according to a position of one of the permanent magnets. The AF coil element and the corresponding surface of the permanent magnets are arranged in the direction parallel to the optical axis.

According to another aspect of the present disclosure, an electronic device includes the aforementioned camera driving module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
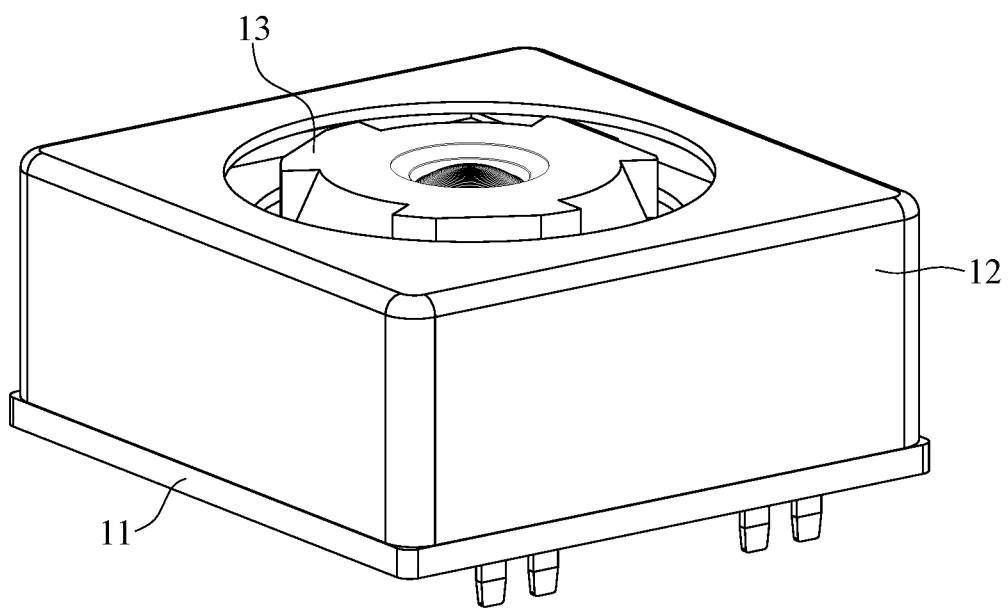
FIG. 1 is a perspective view of a camera driving module according to the 1st embodiment of the present disclosure.

A camera driving module includes a base, a casing, a lens unit and a focus driving part. The base includes a central opening. The casing is disposed on the base, and the casing includes an opening hole corresponding to the central opening of the base. The lens unit is movably disposed on the casing. The focus driving part is configured to drive the lens unit to move in a direction parallel to an optical axis.

The focus driving part includes a carrier, an AF (Automatic focusing) coil element, at least two permanent magnets and a Hall element. The carrier is disposed on the lens unit and movable in the direction parallel to the optical axis. The AF coil element is fixed to the base and faces toward the carrier. The permanent magnets are fixed on one side of the carrier facing toward the base, and the permanent magnets are disposed opposite to each other about the optical axis. Each of the permanent magnets includes a corresponding surface facing toward the AF coil element. The AF coil element and the corresponding surface of the permanent magnets are arranged in the direction parallel to the optical axis. The Hall element faces toward the corresponding surface of one of the permanent magnets, and the Hall element detects the displacement of the lens unit in parallel with the optical axis according to the position of one of the permanent magnets. Therefore, the arrangement of the permanent magnets, the Hall element and the AF coil element is favorable for reducing the assembling complexity of the camera driving module, and further reducing repeated and unnecessary steps for alignment and calibration; furthermore, the AF coil element disposed on the base is favorable for reducing the size of the focus driving part, and achieving feedback control functions in the optical axis direction.

The AF coil element can include a through hole corresponding to the central opening of the base. Therefore, it is favorable for better controlling the assembling precision of the AF coil element and the base, and achieving an even and consistent efficiency of electromagnetic effect between the AF coil element and the permanent magnets.

The base can further include a side wall structure surrounding the central opening of the base. The side wall structure can include a lateral surface facing toward the permanent magnets, and the lateral surface can have an even number of first grooves. Therefore, the first grooves may be configured with additional rigid mechanism (e.g., the spherical bearing elements described below) disposed therein so as to minimize the assembly failure rate of the camera driving module.

The first grooves can extend in the direction parallel to the optical axis. Therefore, it is favorable for reducing the difficulty of the injection molding for manufacturing the base so as to increase the consistency of the dimensions of the base, and thus a tilt of the camera driving module caused by the base is prevented.

The permanent magnets can be fixed on a carrying surface of the carrier, and the carrying surface can have an even number of second grooves respectively corresponding to the first grooves. Therefore, the even number of second grooves is favorable for the linear movement stability of the lens unit in a two-dimensional plane.

According to the present disclosure, the camera driving module can further include a plurality of spherical bearing elements disposed between one of the first grooves and corresponding one of the second grooves. Therefore, a larger rigidity of the spherical bearing element is favorable for increasing the consistency of quality of the camera driving module when the spherical bearing elements are configured with mechanisms having a preload force (e.g., the configuration of the magnetic plate and permanent magnets); furthermore, the spherical bearing element is favorable for reducing assembling complexity.

Both the number of the first grooves and the number of the second grooves can be four. Therefore, a configuration of the camera driving module including four first grooves and four second grooves is favorable for preventing unpredictable tilt of the lens unit when the lens unit moves, thereby increasing the linear movement stability of the lens unit in the optical axis direction.

According to the present disclosure, the camera driving module can further include a magnetic plate. The side wall structure can include at least three side walls extending from the central opening of the base towards the opening hole of the casing in the direction parallel to the optical axis. The magnetic plate and one or more first grooves are disposed on one of the side walls, and the magnetic plate correspond to one of the permanent magnets. Therefore, it is favorable for applying a preload force on the camera driving module by the magnetic plate corresponding to the permanent magnets, such that the spherical bearing elements disposed between the first and second grooves satisfy the requirement of stabilizing the module, thereby significantly increasing the accuracy and straightness of movement of the lens unit in the optical axis direction.

The base can be a unitary element. Therefore, it is favorable for reducing the amount of required components and additional assembly process, and also minimizing the cumulative errors during collaboration. Moreover, the side wall structure can be in a shape of closed ring. Therefore, when the base is a unitary element and the side wall structure is a close-ring shaped structure, it is favorable for reducing the use of frame elements, the corresponding assembling process and repeated alignment and calibration steps during assembling, thereby significantly increasing the efficiency of assembly of the camera driving module.

The base can further include at least three gate portions surrounding the central opening of the base. Therefore, with respect to an injection molded plastic part with an opening hole, the design of plural gate portions surrounding the central opening is favorable for reducing the failure rates of dimension variation and appearance defects, and also favorable for obtaining a better control of the shrinkage of the plastic part.

The lens unit and the carrier can be integrally formed as a coaxial unitary element, and the coaxial unitary element defines an inner space for accommodating at least one optical lens element. Therefore, it is favorable for omitting a dispensing process for attaching the lens unit to the carrier, and thereby satisfying the conditions of harsher environmental tests; furthermore, the requirement of assembling accuracy of the lens unit and the carrier can be significantly improved by ensuring the precision of the injection mold, and the product dimension consistency can be ensured in mass production.

According to the present disclosure, the camera driving module can further include a stopper mechanism configured to restrict the movement range of the carrier in the direction parallel to the optical axis. The stopper mechanism can include an upper stopper element, and the upper stopper element can be closer to the opening hole of the casing than the carrier to the opening hole. Therefore, the upper stopper element with specific thickness can be configured as a space separator/adjuster for preventing noise made by the collision of the lens unit with the carrier during focusing.

The stopper mechanism can further include at least two lower stopper portions respectively disposed on opposite sides of the central opening of the base, and the lower stopper portions and the base can be integrally formed as a unitary element. The lower stopper portions can extend from the base towards the opening hole of the casing. Therefore, when the lower stopper portions and the base are formed as a unitary element, the lower stopper portions can be fine adjusted by mold design so as to prevent the interference between the carrier and the central opening area of the base, thereby reducing impact noise.

The number of the lower stopper portions can be three or more, and the gate portions of the base can be respectively and correspondingly disposed on the lower stopper portions; that is, the gate portions are disposed on respective lower stopper portions. Therefore, the gate portions are favorable for reducing the complexity of the groove shape of each gate portion so as to effectively increase the production efficiency of injection molded parts and reduce the defect rate; furthermore, the gate portions disposed on respective lower stopper portions is favorable for making good use of the thickness of the lower stopper portions to adjust the mold design of the gate portions, making the design of the gate portions is not limited to the form of conventional base featuring a plate shape with an opening hole.

When a distance parallel to the optical axis between the AF coil element and the permanent magnets is Dc, and a distance parallel to the optical axis between the Hall element and the permanent magnets is Dh, the following condition can be satisfied: $0.0 < Dc/Dh \leq 1.0$. Therefore, it is favorable for fully utilizing the space of the camera driving module so as to reduce the amount of unused space among components. Furthermore, when an area on the AF coil element surrounded by the voice coil is larger than the surface of the Hall element facing toward the permanent magnet, Dc/Dh can be equal to 1.0 (i.e., the AF coil element and the Hall element are located on the same plane), such that the Hall element can accurately detect the displacement of the permanent magnet in parallel with the optical axis. Please refer to FIG. 4, which shows a schematic view of Dc and Dh according to the 1st embodiment of the present disclosure.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
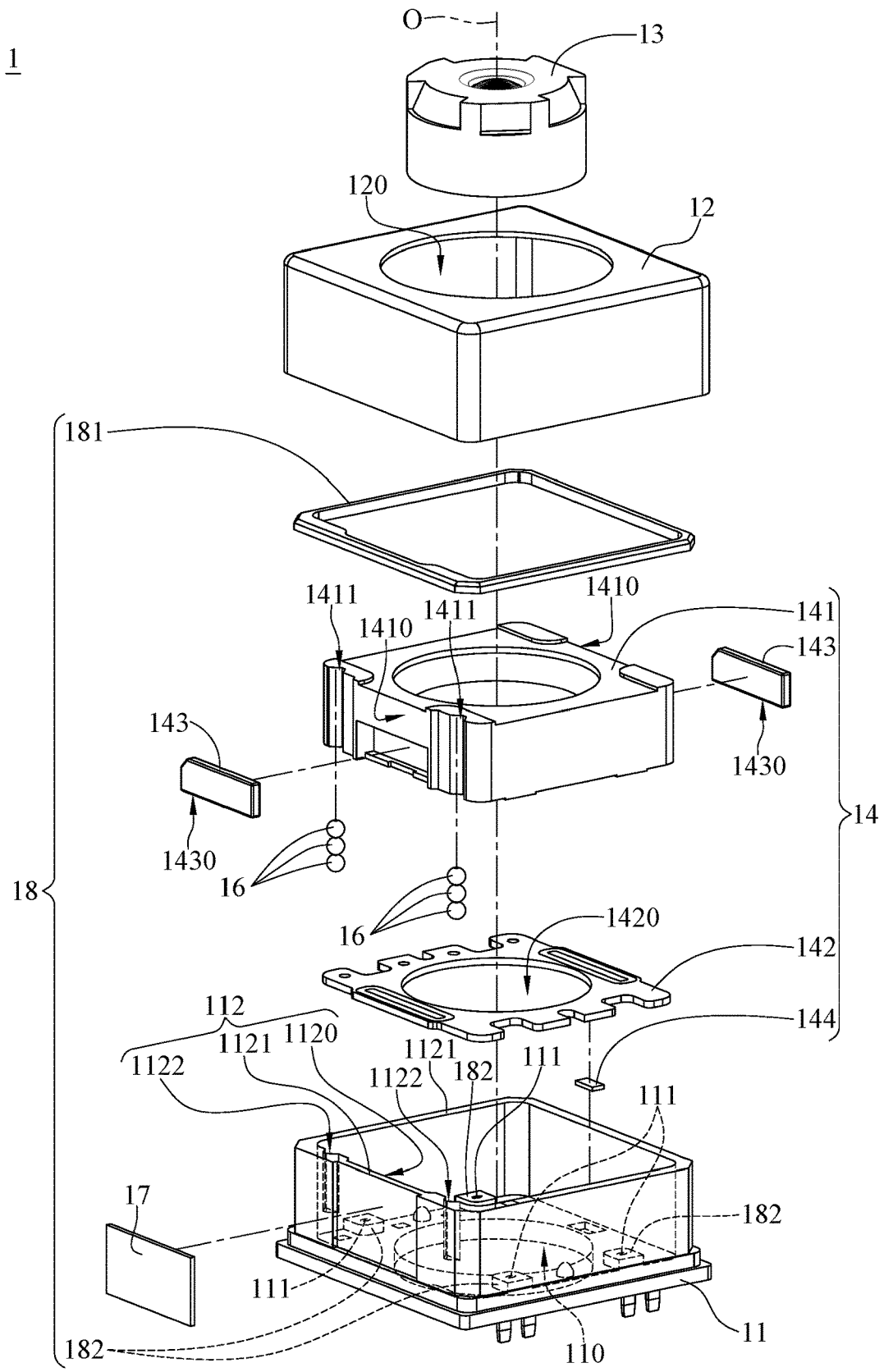
FIG. 2 is an exploded view of the camera driving module in FIG. 1.
Figure 3:
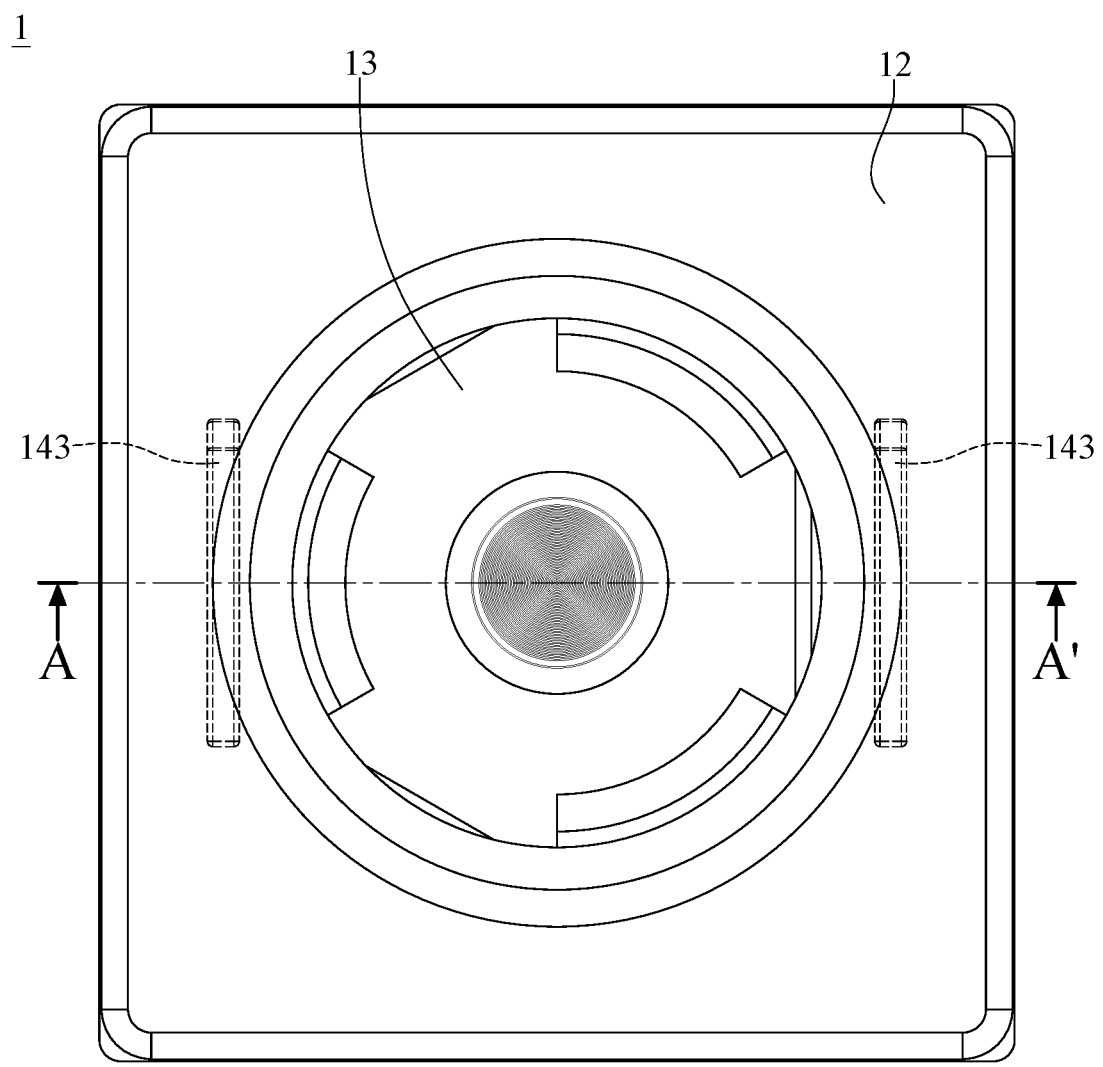
FIG. 3 is a top view of the camera driving module in FIG. 1.
Figure 4:
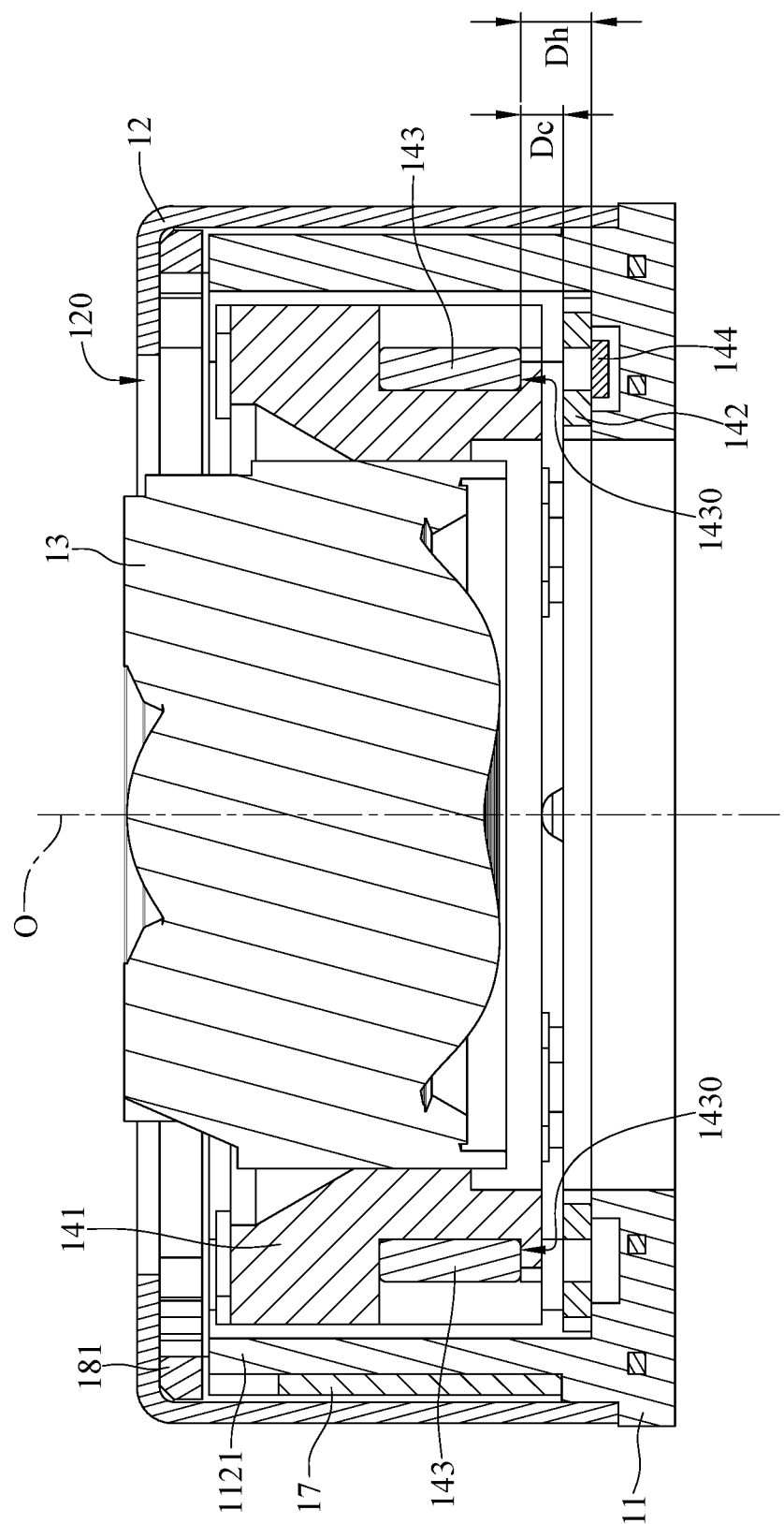
FIG. 4 is a cross-sectional view of the camera driving module in FIG. 3 along line A-A'.

FIG. 1 is a perspective view of a camera driving module according to the 1st embodiment of the present disclosure. FIG. 2 is an exploded view of the camera driving module in FIG. 1. FIG. 3 is a top view of the camera driving module in FIG. 1. FIG. 4 is a cross-sectional view of the camera driving module in FIG. 3 along line A-A'. In this embodiment, a camera driving module 1 includes a base 11, a casing 12, a lens unit 13, a focus driving part 14, a plurality of spherical bearing elements 16, a magnetic plate 17 and a stopper mechanism 18.

The base 11 is a unitary element which includes a central opening 110, four gate portions 111 and a side wall structure 112. These gate portions 111 and the side wall structure 112 are all disposed around the central opening 110.

The casing 12 is disposed on the base 11, and the casing 12 includes an opening hole 120 corresponding to the central opening 110 of the base 11.

The lens unit 13 is disposed on the casing 12, and the lens unit 13 can be driven by the focus driving part 14 to be movable in a direction parallel to an optical axis O. In detail, the focus driving part 14 includes a carrier 141, an AF coil element 142, two permanent magnets 143 and a Hall element 144.

The carrier 141 is disposed on the lens unit 13, and the carrier 141 is movable in the direction parallel to the optical axis O. The carrier 141 has a carrying surface 1410 facing toward the base 11.

The AF coil element 142 is fixed to the base 11 and faces toward the carrier 141. The AF coil element 142 includes a through hole 1420 corresponding to the central opening 110 of the base 11. In this embodiment, the AF coil element 142 is, but not limited to, a flexible printed circuit coil (FPC coil), which allows at least two auto focus coils to be integrated as a unitary one-piece element.

The permanent magnets 143 are fixed on the carrying surface 1410 of the carrier 141, and the permanent magnets 143 are disposed opposite to each other about the optical axis O. Each of the permanent magnets 143 includes a corresponding surface 1430 facing toward the AF coil element 142. Moreover, the AF coil element 142 and the corresponding surface 1430 of the permanent magnets 143 are arranged in the direction parallel to the optical axis O.

The Hall element 144 faces toward the corresponding surface 1430 of one of the permanent magnets 143, and the Hall element 144 detects the displacement of the lens unit 13 in parallel with the optical axis O according to the position of one of the permanent magnets 143.

The side wall structure 112 of the base 11 is in a shape of closed ring, and the side wall structure 112 includes a lateral surface 1120 and four side walls 1121. The lateral surface 1120 faces toward the permanent magnets 143, and the side walls 1121 extend from the central opening 110 of the base 11 towards the opening hole 120 of the casing 12 in the direction parallel to the optical axis O. The lateral surface 1120 has two first grooves 1122, and the carrying surface 1410 of the carrier 141 has two second grooves 1411 respectively corresponding to the first grooves 1122. In this embodiment, the first grooves 1122 and the second grooves 1411 all extend in the direction parallel to the optical axis O.

The spherical bearing elements 16 are disposed between each pair of first groove 1122 and second groove 1411. The magnetic plate 17 and the first grooves 1122 are all disposed on one of the side walls 1121 and located on opposite sides of the side wall 1121. The magnetic plate 17 corresponds to one of the permanent magnets 143.

The stopper mechanism 18 includes an upper stopper element 181 and four lower stopper portions 182. The upper stopper element 181 is disposed near the opening hole 120 of the casing 12. The upper stopper element 181 is closer to the opening hole 120 of the casing 12 than the carrier 141 to opening hole 120, and the upper stopper element 181 is disposed between the carrier 141 and the opening hole 120 of the casing 12. The lower stopper portions 182 are respectively disposed on opposite sides of the central opening 110 of the base 11. The lower stopper portions 182 and the base 11 are integrally formed as a unitary element, and the lower stopper portions 182 extend from the base 11 towards the opening hole 120 of the casing 12. Furthermore, the gate portions 111 of the base 11 are respectively and correspondingly disposed on the lower stopper portions 182.

When a distance parallel to the optical axis O between the AF coil element 142 and the permanent magnets 143 is Dc, and a distance parallel to the optical axis O between the Hall element 144 and the permanent magnets 143 is Dh, the following condition is satisfied: $Dc/Dh=0.6$.

Figure 5:
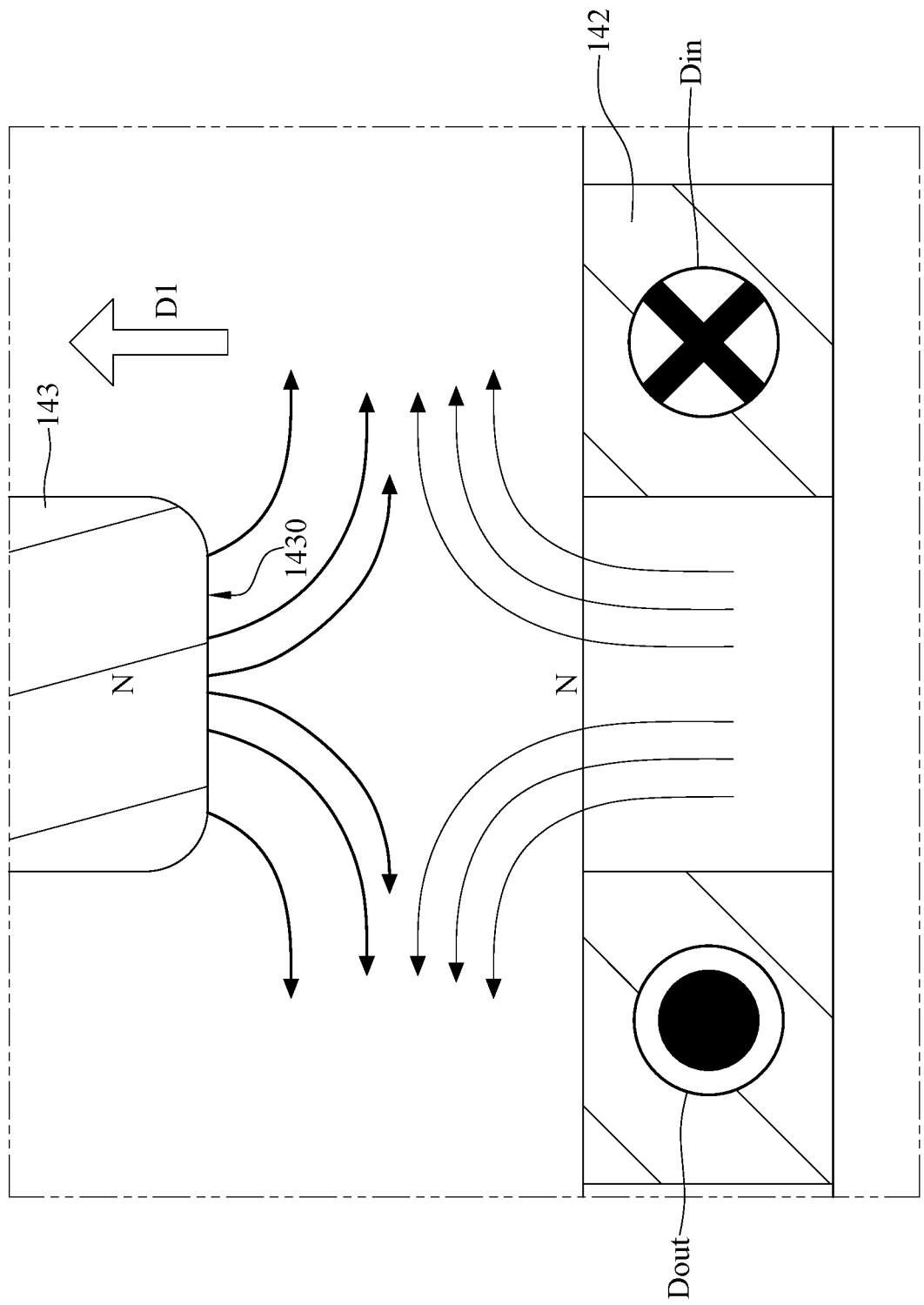
FIG. 5 is a schematic view of an AF coil element and a permanent magnet in FIG. 4 repelling each other.
Figure 6:
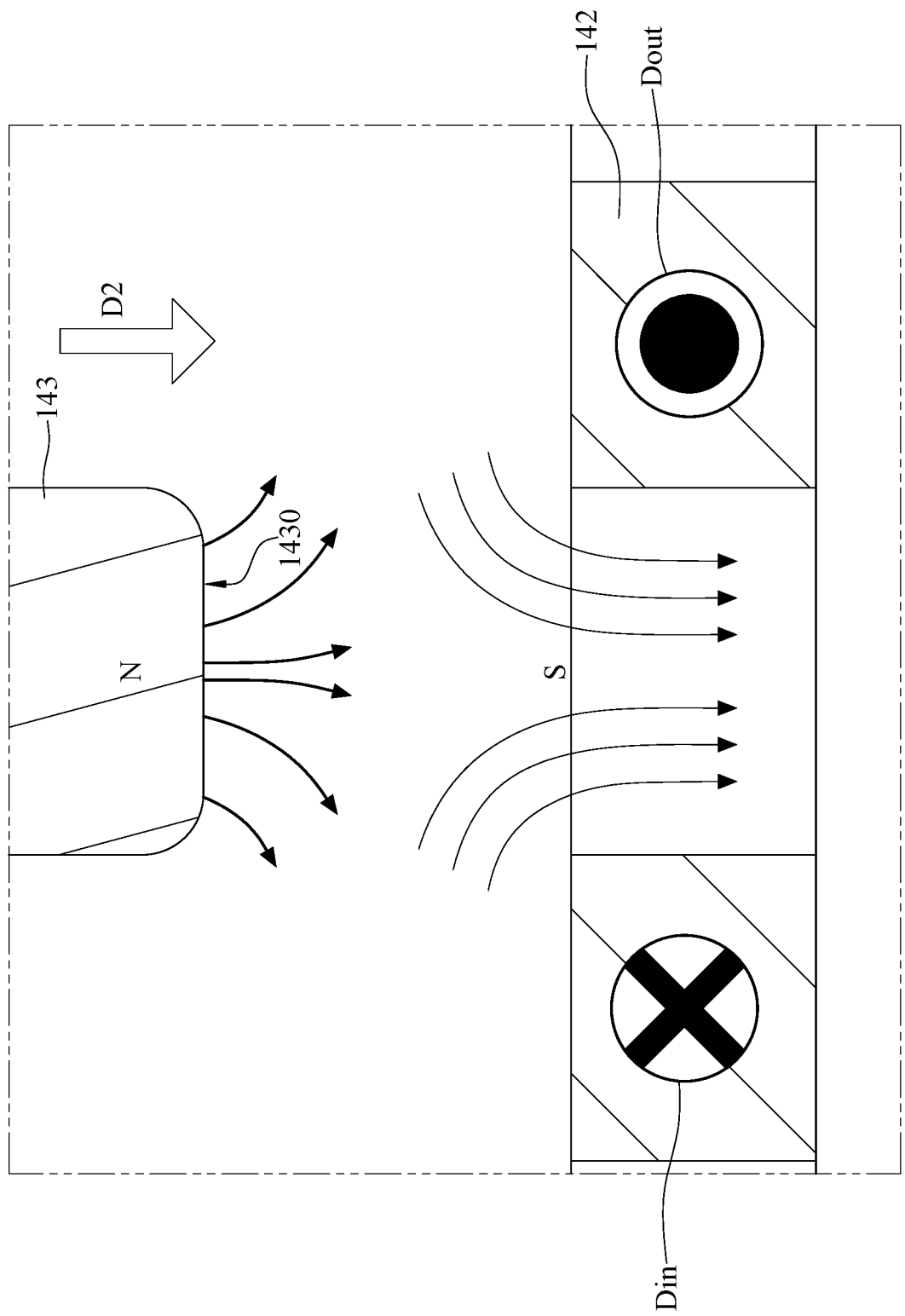
FIG. 6 is a schematic view of the AF coil element and the permanent magnet in FIG. 4 attracting each other.

According to the present disclosure, the lens unit 13 of the camera driving module 1 is driven to move in the direction parallel to the optical axis O by the magnetic effect of electric current. Specifically, please refer to FIG. 5 and FIG. 6. FIG. 5 is a schematic view of an AF coil element and a permanent magnet in FIG. 4 repelling each other. FIG. 6 is a schematic view of the AF coil element and the permanent magnet in FIG. 4 attracting each other. In this embodiment, one end of the permanent magnet 143 closer to the AF coil element 142 is the north pole N. As shown in FIG. 5, when an electric current in the AF coil element 142 flows in a direction Dout pointing out of the plane of the page on the left-hand side of FIG. 5, and flows in a direction Din pointing into the plane of the page on the right-hand side of FIG. 5, the AF coil element 142 generates a magnetic field repelling the permanent magnets 143, making the permanent magnets 143 bring the carrier 141 and the lens unit 13, which are assembled together, to move in a direction as indicated by an arrow D1. On the other hand, as shown in FIG. 6, when the electric current in the AF coil element 142 flows in the direction Din pointing into the plane of the page on the left-hand side of FIG. 6, and flows in the direction Dout point out of the plane of the page on the right-hand side of FIG. 6, the AF coil element 142 generates a magnetic field attracting the permanent magnets 143, making the permanent magnets 143 bring the carrier 141 and the lens unit 13 to move in a direction as indicated by an arrow D2. Therefore, the focus driving part 14 is utilized for image focusing.

2nd Embodiment

Figure 7:
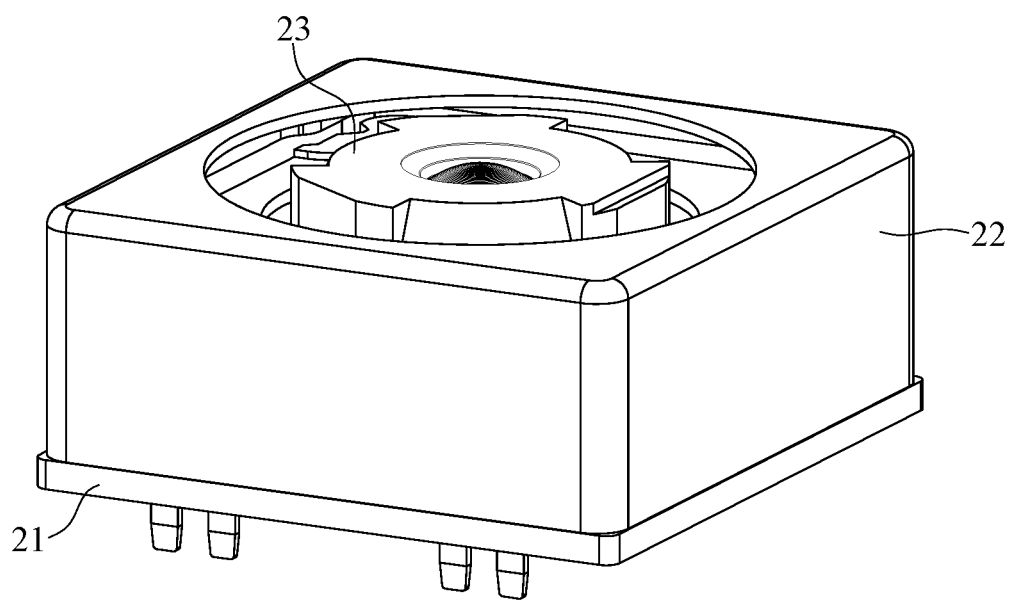
FIG. 7 is a perspective view of a camera driving module according to the 2nd embodiment of the present disclosure.
Figure 8:
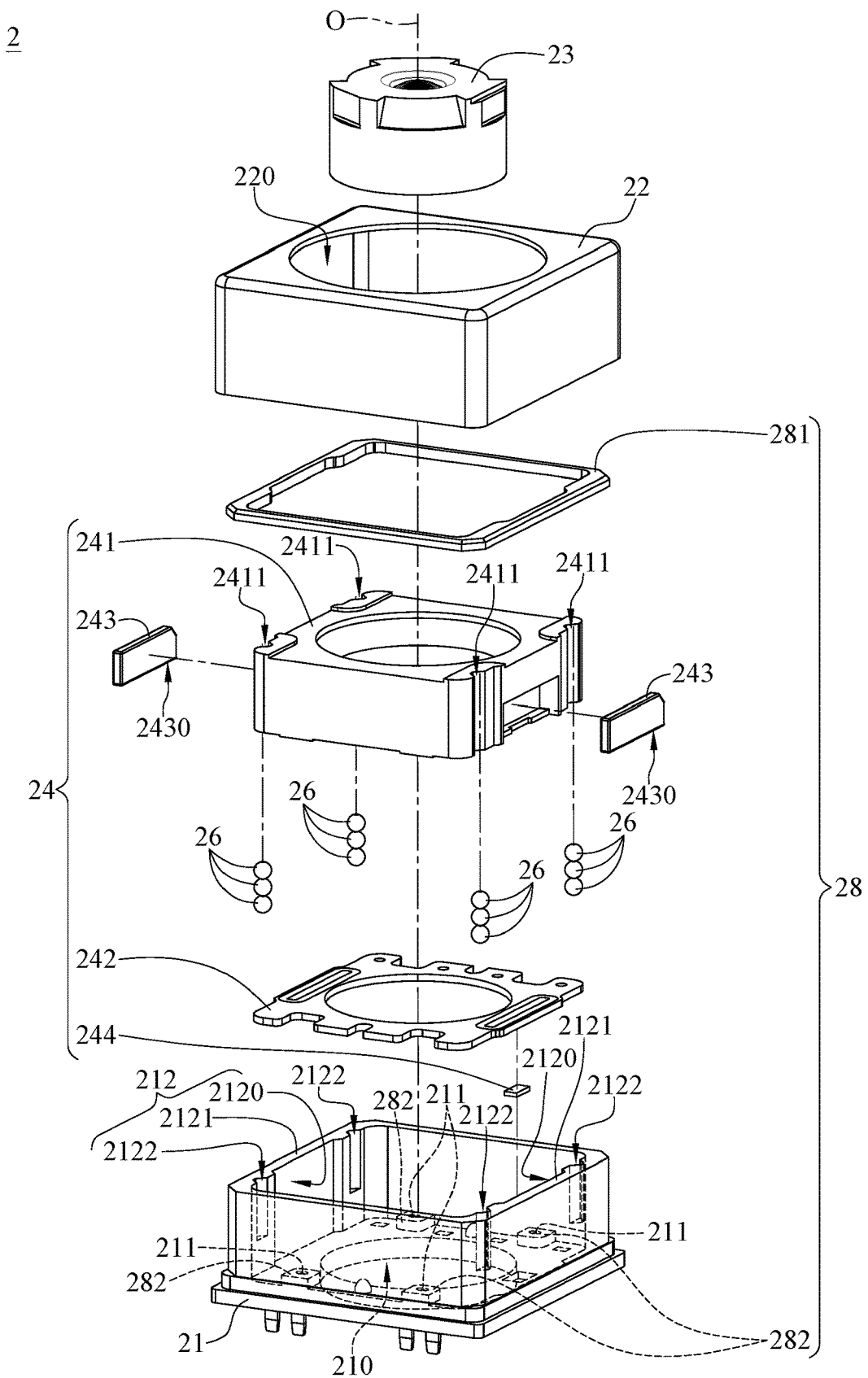
FIG. 8 is an exploded view of the camera driving module in FIG. 7.
Figure 9:
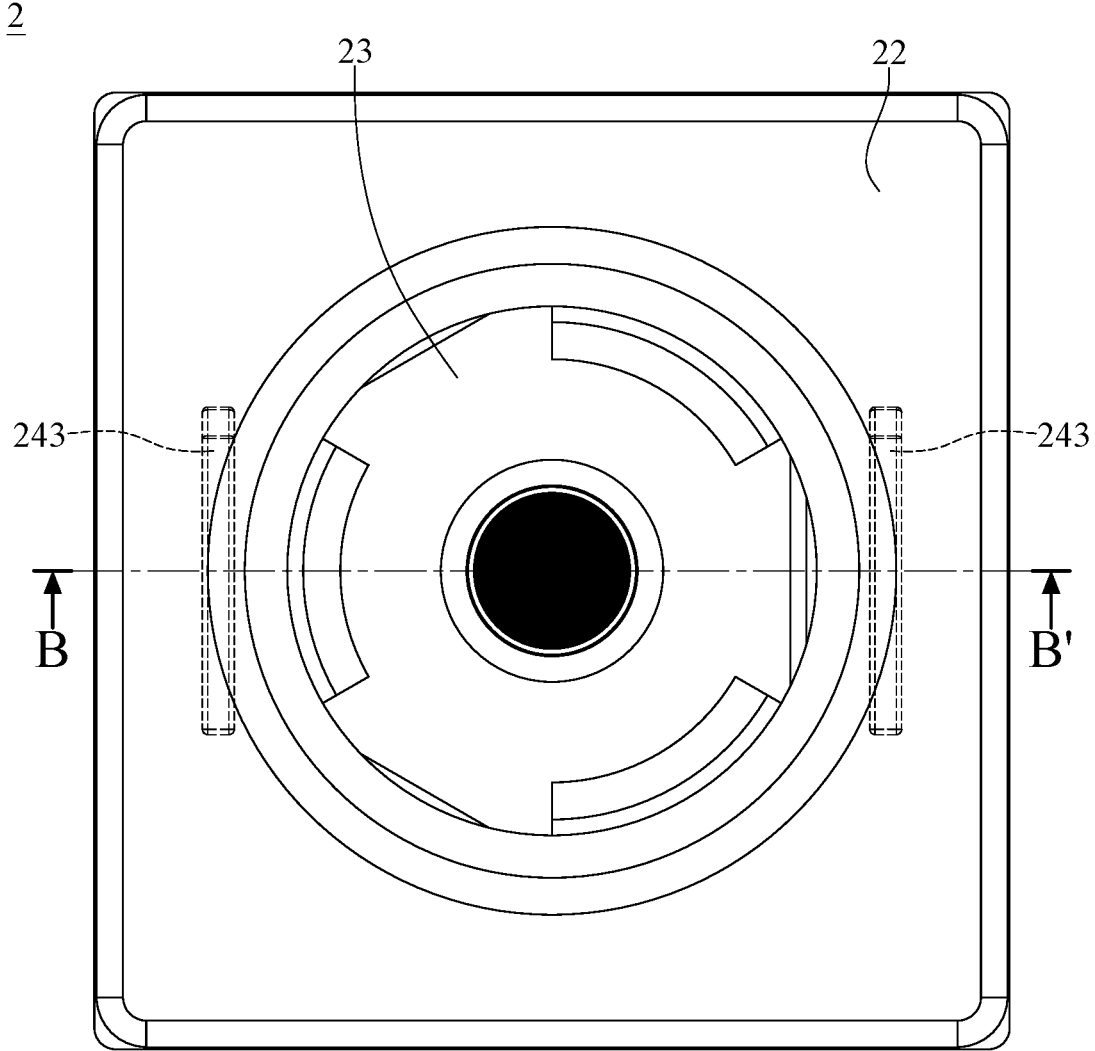
FIG. 9 is a top view of the camera driving module in FIG. 7.
Figure 10:
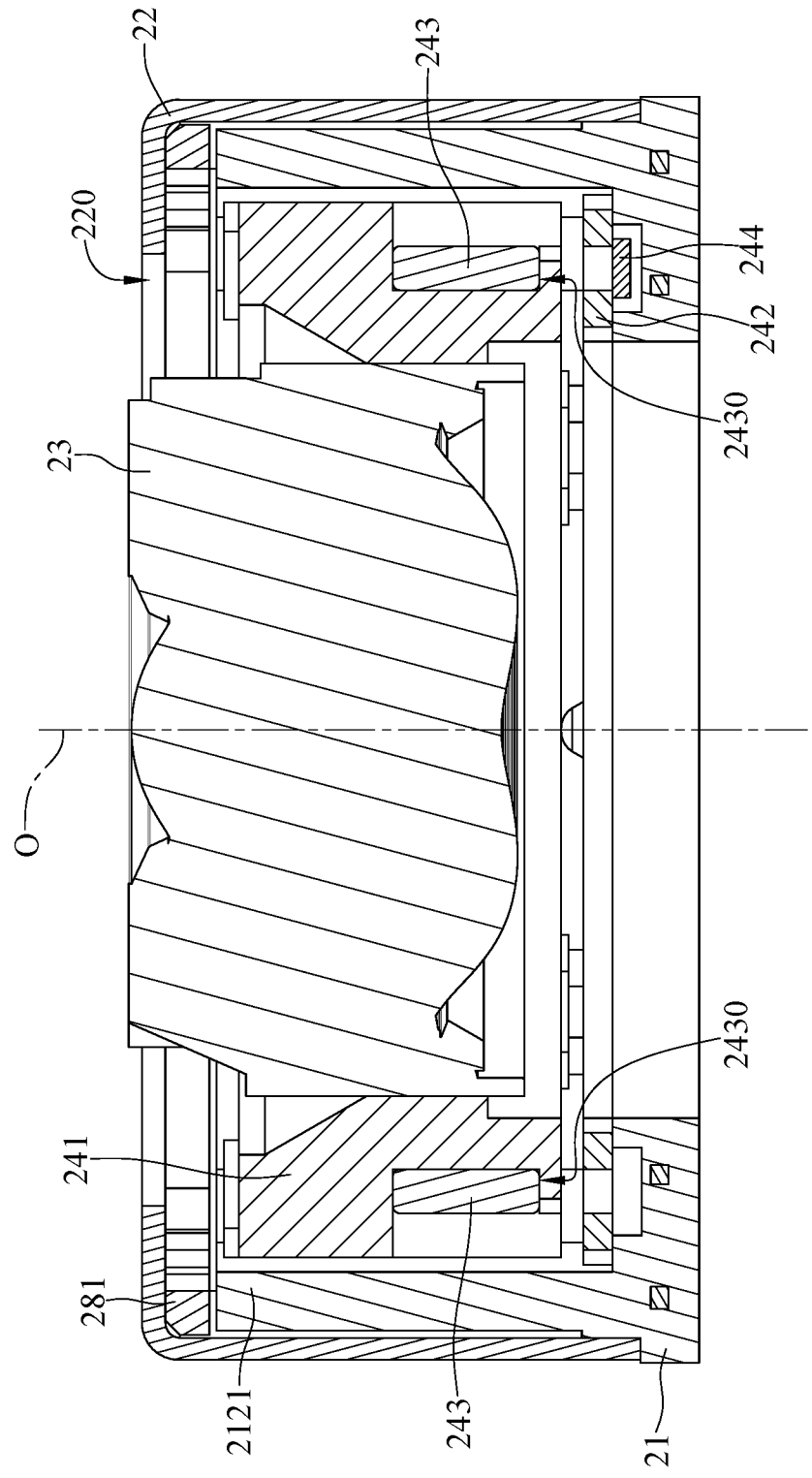
FIG. 10 is a cross-sectional view of the camera driving module in FIG. 9 along line B-B'.

FIG. 7 is a perspective view of a camera driving module according to the 2nd embodiment of the present disclosure. FIG. 8 is an exploded view of the camera driving module in FIG. 7. FIG. 9 is a top view of the camera driving module in FIG. 7. FIG. 10 is a cross-sectional view of the camera driving module in FIG. 9 along line B-B'. In this embodiment, a camera driving module 2 includes a base 21, a casing 22, a lens unit 23, a focus driving part 24, a plurality of spherical bearing elements 26 and a stopper mechanism 28.

The base 21 is a unitary element which includes a central opening 210, four gate portions 211 and a side wall structure 212. These gate portions 211 and the side wall structure 212 are all disposed around the central opening 210.

The casing 22 is disposed on the base 21, and the casing 22 includes an opening hole 220 corresponding to the central opening 210 of the base 21.

The lens unit 23 is disposed on the casing 22, and the lens unit 23 can be driven by the focus driving part 24 to be movable in a direction parallel to an optical axis O. In detail, the focus driving part 24 includes a carrier 241, an AF coil element 242, two permanent magnets 243 and a Hall element 244.

The carrier 241 is disposed on the lens unit 23, and the carrier 241 is movable in the direction parallel to the optical axis O. The carrier 241 has a carrying surface 2410 facing toward the base 21.

The AF coil element 242 is fixed to the base 21 and faces toward the carrier 241. The AF coil element 242 includes a through hole 2420 corresponding to the central opening 210 of the base 21.

The permanent magnets 243 are fixed on the carrying surface 2410 of the carrier 241, and the permanent magnets 243 are disposed opposite to each other about the optical axis O. Each of the permanent magnets 243 includes a corresponding surface 2430 facing toward the AF coil element 242. Moreover, the AF coil element 242 and the corresponding surface 2430 of the permanent magnets 243 are arranged in the direction parallel to the optical axis O.

The Hall element 244 faces toward the corresponding surface 2430 of one of the permanent magnets 243, and the Hall element 244 detects the displacement of the lens unit 23 in parallel with the optical axis O according to the position of one of the permanent magnets 243.

The side wall structure 212 of the base 21 is in a shape of closed ring, and the side wall structure 212 includes a lateral surface 2120 and four side walls 2121. The lateral surface 2120 faces toward the permanent magnets 243, and the side walls 2121 extend from the central opening 210 of the base 21 towards the opening hole 220 of the casing 22 in the direction parallel to the optical axis O. The lateral surface 2120 has four first grooves 2122, and the first grooves 2122 are respectively located on two of the side walls 2121 corresponding to the permanent magnets 243. In addition, the carrying surface 2410 of the carrier 241 has four second grooves 2411 respectively corresponding to the first grooves 2122. In this embodiment, the first grooves 2122 and the second grooves 2411 all extend in the direction parallel to the optical axis O.

The spherical bearing elements 26 are disposed between each pair of first groove 2122 and second groove 2411.

The stopper mechanism 28 includes an upper stopper element 281 and four lower stopper portions 282. The upper stopper element 281 is disposed near the opening hole 220 of the casing 22. The upper topper element 281 is closer to the opening hole 220 of the casing 22 than the carrier 241 to the opening hole 220, and the upper stopper element 281 is disposed between the carrier 241 and the opening hole 220 of the casing 22. The lower stopper portions 282 are respectively disposed on opposite sides of the central opening 210 of the base 21. The lower stopper portions 282 and the base 21 are integrally formed as a unitary element, and the lower stopper portions 282 extend from the base 21 towards the opening hole 220 of the casing 22. Furthermore, the gate portions 211 of the base 21 are respectively and correspondingly disposed on the lower stopper portions 282.

When a distance parallel to the optical axis O between the AF coil element 242 and the permanent magnets 243 is Dc, and a distance parallel to the optical axis O between the Hall element 244 and the permanent magnets 243 is Dh, the following condition is satisfied: Dc/Dh=0.6.

3rd Embodiment

Figure 11:
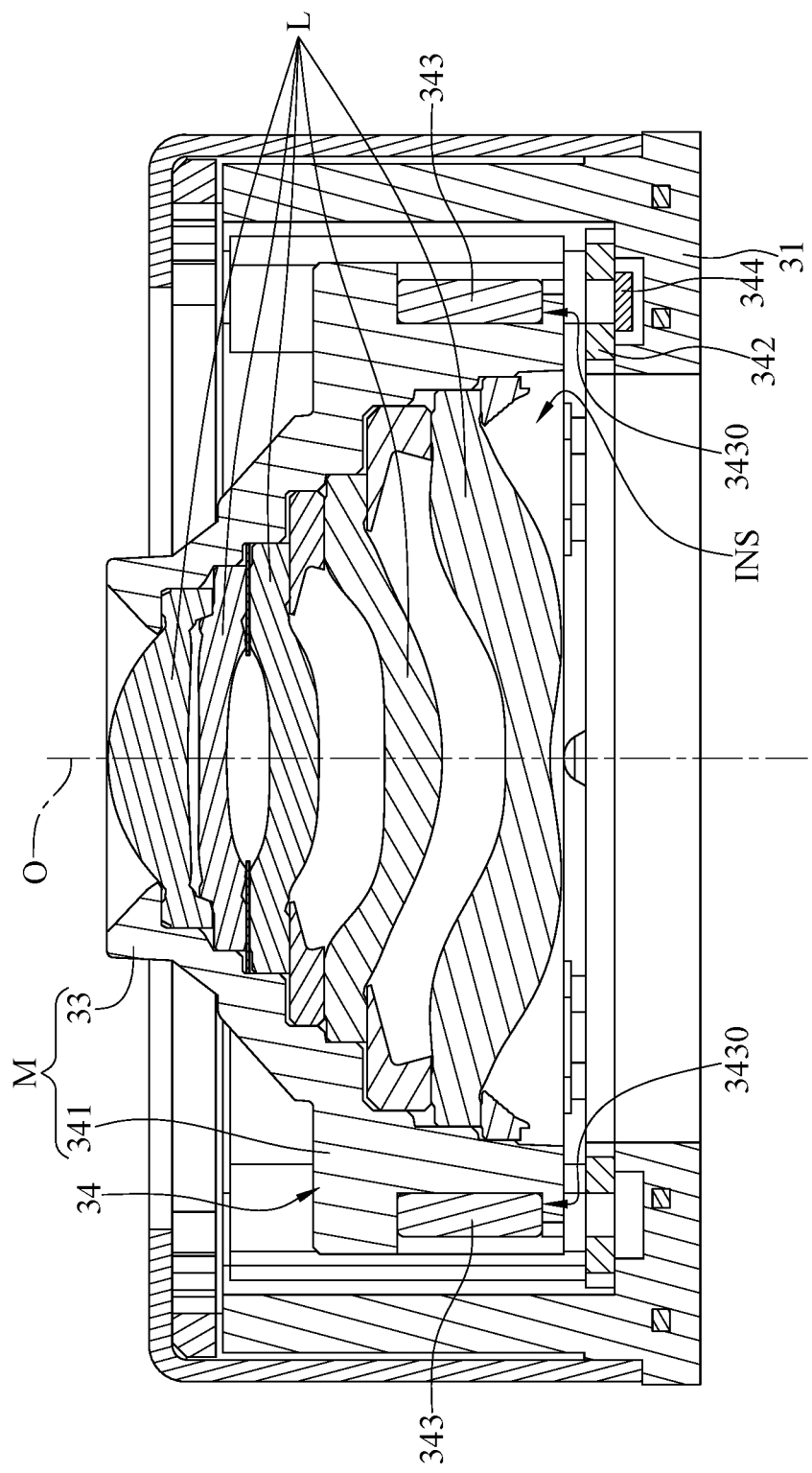
FIG. 11 is a cross-sectional view of a camera driving module according to the 3rd embodiment of the present disclosure.
Figure 12:
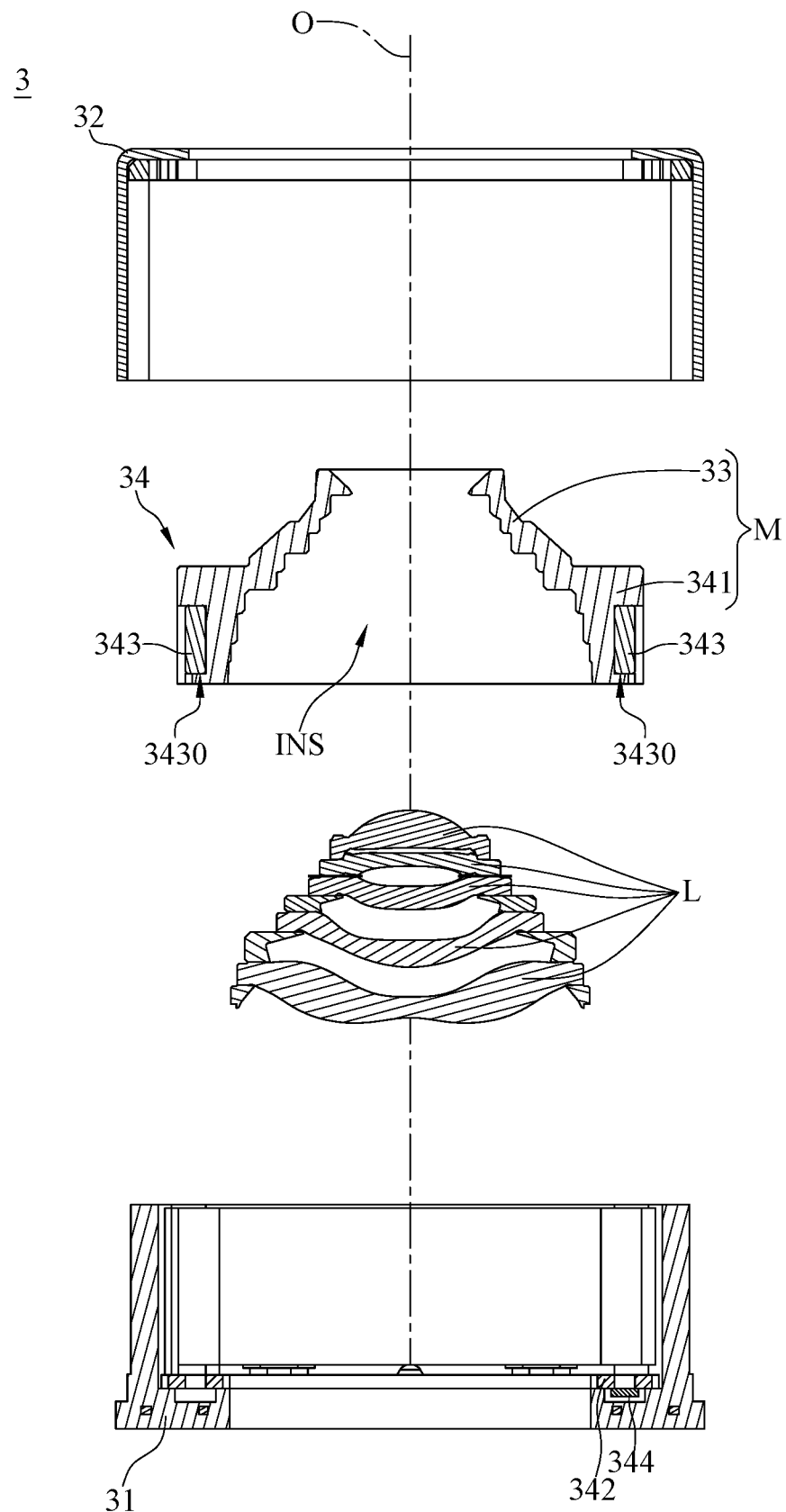
FIG. 12 is a partial exploded view of the camera driving module in FIG. 11.

FIG. 11 is a cross-sectional view of a camera driving module according to the 3rd embodiment of the present disclosure. FIG. 12 is a partial exploded view of the camera driving module in FIG. 11. In this embodiment, a camera driving module 3 includes a base 31, a casing 32, a lens unit 33 and a focus driving part 34. The casing 32 is disposed on the base 31, and the lens unit 33 is movably disposed on the casing 32.

The focus driving part 34 includes a carrier 341, an AF coil element 342, two permanent magnets 343 and a Hall element 344.

The lens unit 33 and the carrier 341 are integrally formed as a coaxial unitary element M, and the coaxial unitary element M defines an inner space INS for accommodating a plurality of optical lens elements L.

The AF coil element 342 is fixed to the base 31 and faces toward the carrier 341.

The permanent magnets 343 are fixed to the carrier 341 and disposed opposite to each other about an optical axis O. Each of the permanent magnets 343 includes a corresponding surface 3430 facing toward the AF coil element 342. Moreover, the AF coil element 342 and the corresponding surface 3430 of the permanent magnets 343 are arranged in the direction parallel to the optical axis O.

The Hall element 344 faces toward the corresponding surface 3430 of one of the permanent magnets 343, and the Hall element 344 detects the displacement of the lens unit 33 in parallel with the optical axis O according to the position of one of the permanent magnets 343.

4th Embodiment

Figure 13:
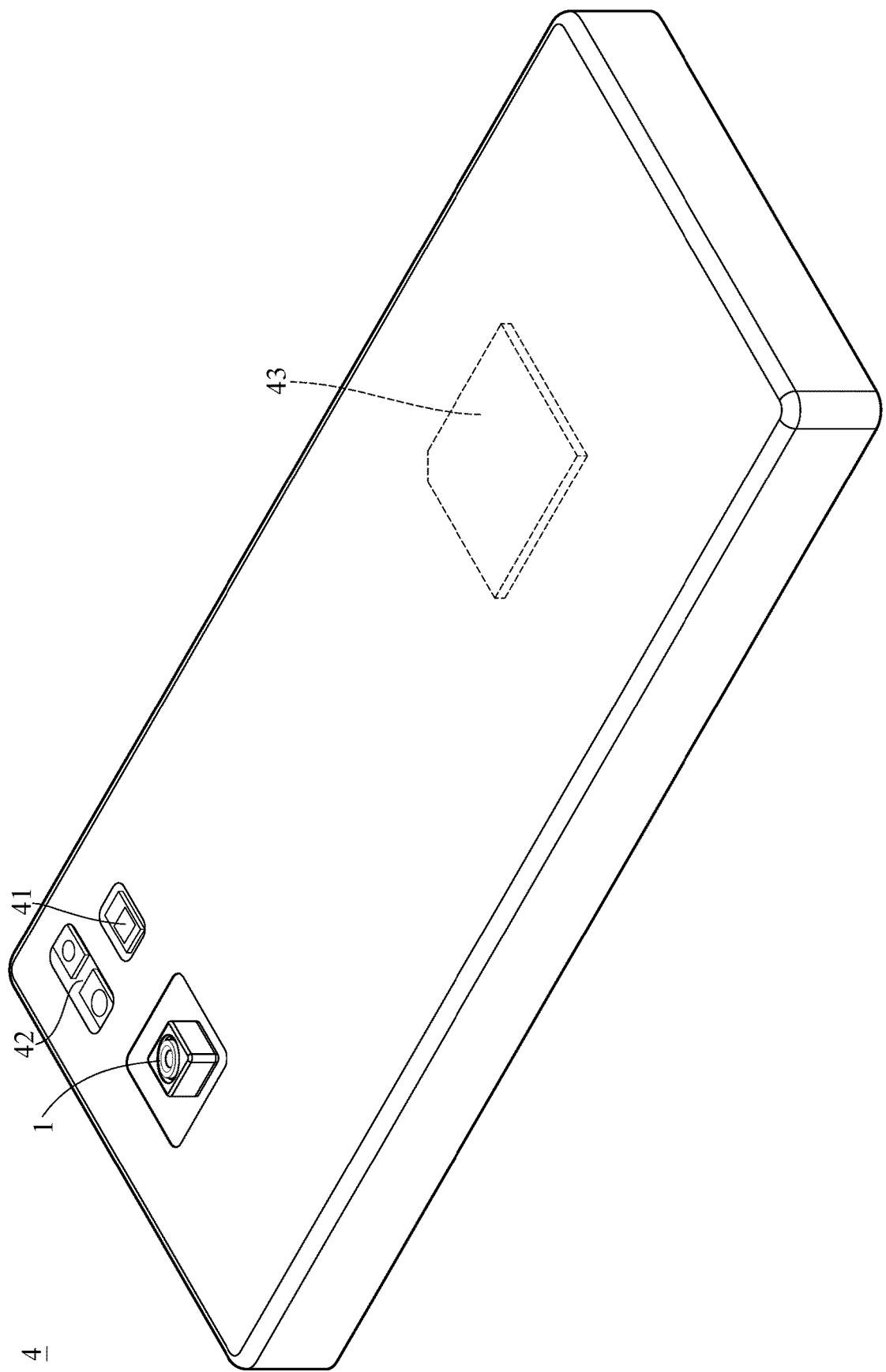
FIG. 13 is one perspective view of an electronic device according to the fourth embodiment of the present disclosure.
Figure 14:
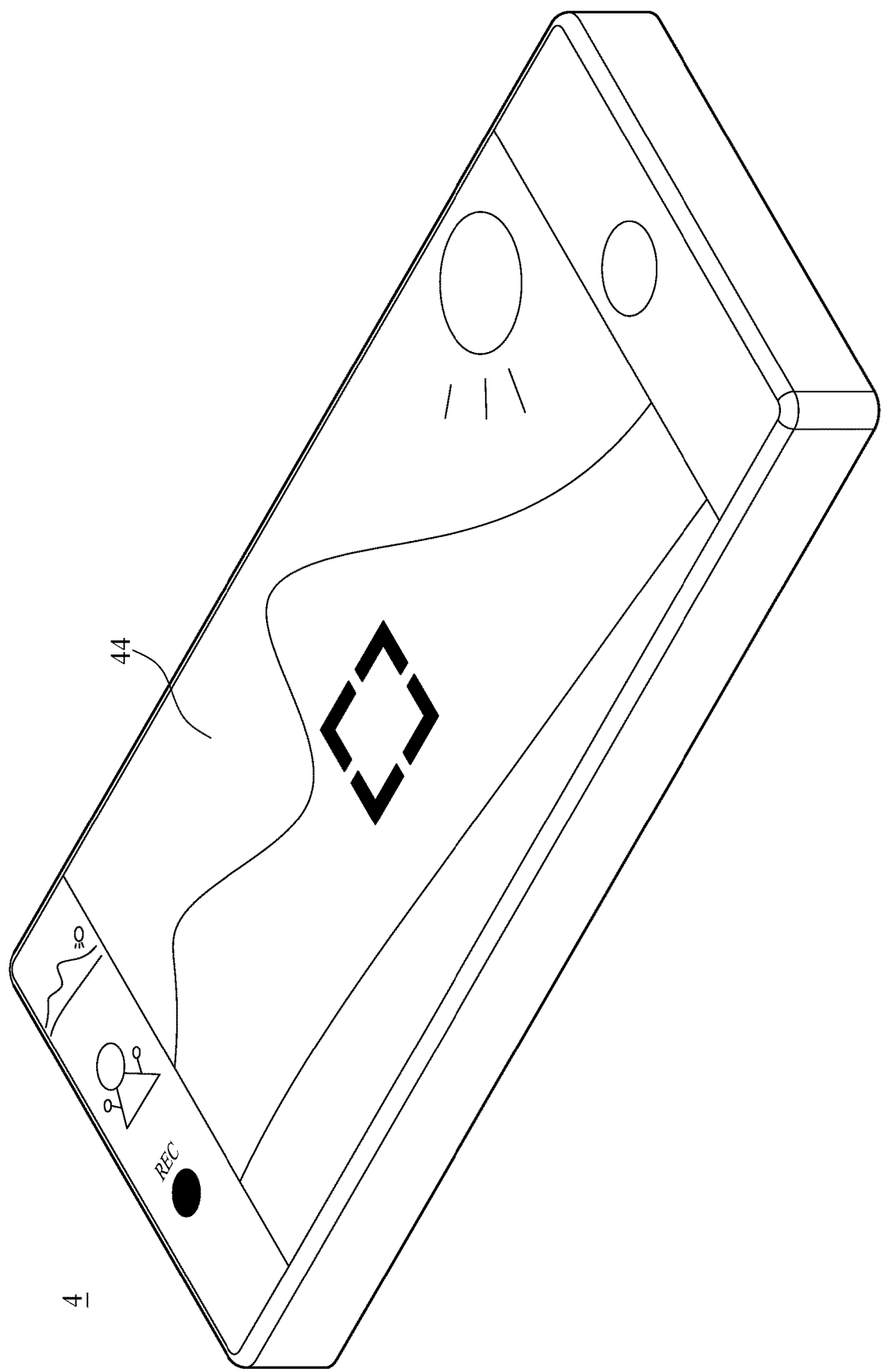
FIG. 14 is another perspective view of the electronic device in FIG. 13.

FIG. 13 is one perspective view of an electronic device according to the fourth embodiment of the present disclosure. FIG. 14 is another perspective view of the electronic device in FIG. 13.

In this embodiment, an electronic device 4 is a smartphone including the camera driving module 1 disclosed in the 1st embodiment, a flash module 41, a focus assist module 42, an image signal processor 43, a user interface 44 and an image software processor.

When a user captures images of an object, the light rays converge in the camera driving module 1 to generate an image(s), and the flash module 41 is activated for light supplement. The focus assist module 42 detects the object distance of the imaged object to achieve fast auto focusing. The image signal processor 43 is configured to optimize the captured image to improve image quality. The light beam emitted from the focus assist module 42 can be either conventional infrared or laser. The user interface 44 can be a touch screen or a physical button. The user is able to interact with the user interface 44 and the image software processor having multiple functions to capture images and complete image processing. The image processed by the image software processor can be displayed on the user interface 44.

The smartphone in this embodiment is only exemplary for showing the camera driving module 1 of the present disclosure installed in an electronic device, and the present disclosure is not limited thereto. The camera driving module 1 can be optionally applied to optical systems with a movable focus. Furthermore, the camera driving module 1 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera driving module, comprising;
a base comprising a central opening;
a casing disposed on the base, and the casing comprising an opening hole corresponding to the central opening of the base;
a lens unit movably disposed on the casing; and
a focus driving part configured to drive the lens unit to move in a direction parallel to an optical axis of the lens unit, and the focus driving part comprising:
a carrier disposed on the lens unit, and the carrier being movable in the direction parallel to the optical axis;
an AF coil element fixed to the base, and the AF coil element facing toward the carrier;
at least two permanent magnets fixed on one side of the carrier facing toward the base, wherein the at least two permanent magnets are disposed opposite to each other about the optical axis, and one of the at least two permanent magnets comprises a corresponding surface facing toward the AF coil element; and
a Hall element facing toward one of the at least two permanent magnets;
wherein the Hall element detects a displacement of the lens unit in parallel with the optical axis according to a position of one of the at least two permanent magnets, and the AF coil element and the corresponding surface are arranged in the direction parallel to the optical axis;
wherein a distance parallel to the optical axis between the AF coil element and the at least two permanent magnets is Dc, a distance parallel to the optical axis between the Hall element and the at least two permanent magnets is Dh, and the following condition is satisfied:

$$0.0 < Dc/Dh \leq 1.0.$$

2. The camera driving module of claim 1, wherein the AF coil element comprises a through hole corresponding to the central opening of the base.

3. The camera driving module of claim 1, wherein the base further comprises a side wall structure surrounding the central opening, a lateral surface of the side wall structure faces toward the at least two permanent magnets, and the lateral surface has an even number of first grooves.

4. The camera driving module of claim 3, wherein each of the first grooves extends in the direction parallel to the optical axis.

5. The camera driving module of claim 4, wherein the lens unit and the carrier are integrally formed as a coaxial unitary element, and the coaxial unitary element defines an inner space for accommodating at least one optical lens element.

6. The camera driving module of claim 3, wherein the at least two permanent magnets are fixed on a carrying surface of the carrier, and the carrying surface has an even number of second grooves respectively corresponding to the first grooves.

7. The camera driving module of claim 6, further comprising a plurality of spherical bearing elements, wherein the plurality of spherical bearing elements are disposed between one of the first grooves and corresponding one of the second grooves.

8. The camera driving module of claim 6, wherein the number of the first grooves is four, and the number of the second grooves is four.

9. The camera driving module of claim 3, further comprising a magnetic plate, wherein the side wall structure comprises at least three side walls, each of the at least three side walls extends from the central opening of the base towards the opening hole of the casing in the direction parallel to the optical axis, the first grooves and the magnetic plate are disposed on one of the at least three side walls, and the magnetic plate corresponds to one of the at least two permanent magnets.

10. The camera driving module of claim 3, wherein the base is a unitary element, and the side wall structure is in a shape of closed ring.

11. The camera driving module of claim 10, wherein the base further comprises at least three gate portions surrounding the central opening of the base.

12. The camera driving module of claim 1, further comprising a stopper mechanism configured to restrict a movement range of the carrier in the direction parallel to the optical axis, wherein the stopper mechanism comprises an upper stopper element, and the upper stopper element is closer to the opening hole of the casing than the carrier to the opening hole.

13. The camera driving module of claim 12, wherein the stopper mechanism further comprises at least two lower stopper portions respectively disposed on opposite sides of the central opening of the base, the at least two lower stopper portions and the base are integrally formed as a unitary element, and each of the at least two lower stopper portions extends from the base towards the opening hole of the casing.

14. The camera driving module of claim 13, wherein the base further comprises at least three gate portions, the number of the at least two lower stopper portions is three or more, and the at least three gate portions are respectively and correspondingly disposed on the at least three lower stopper portions.

15. An electronic device, comprising the camera driving module of claim 1.

* * * * *